Figure 1:
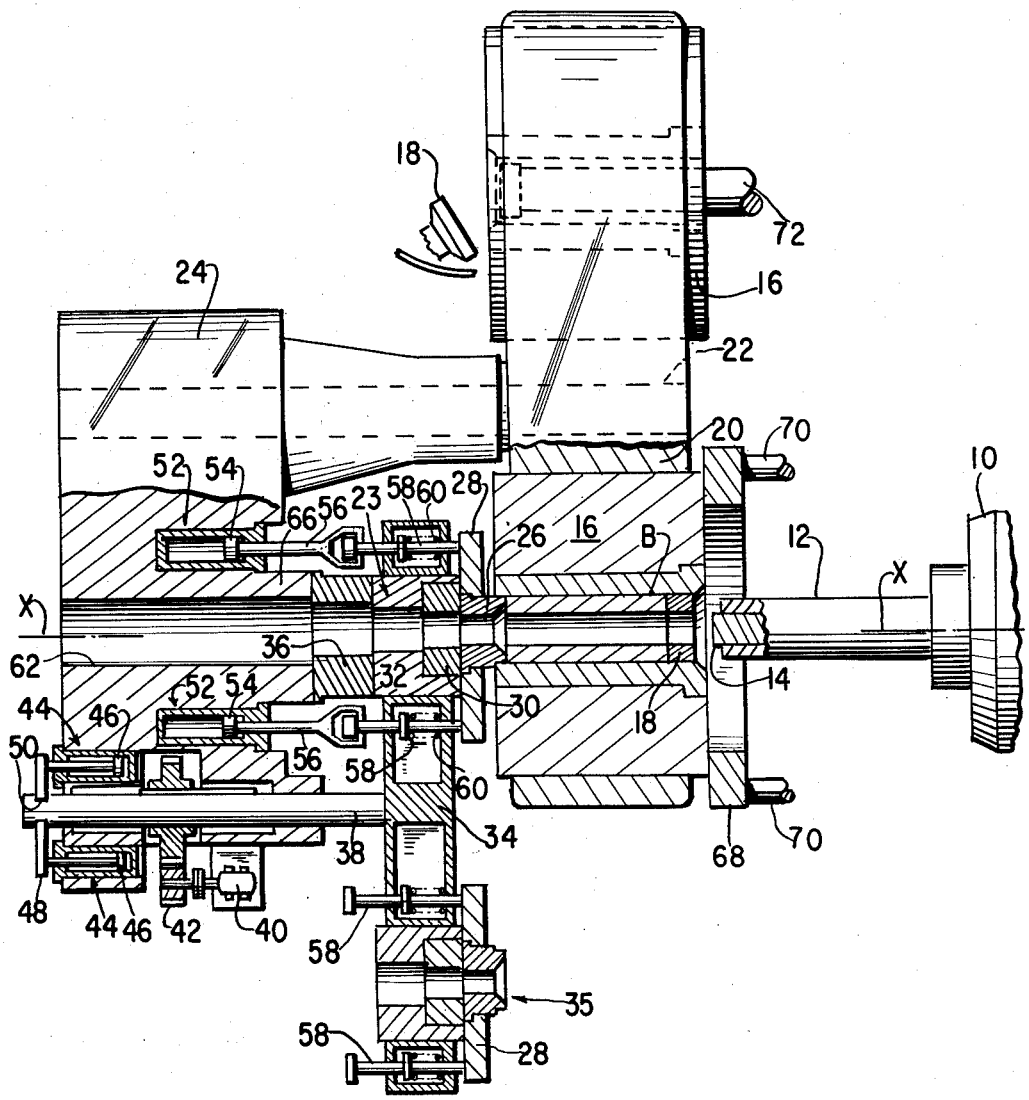

Sept. 8, 1964   S. A. ROSENTHAL   3,147,863
EXTRUSION PRESS WITH ROTARY DIE CARRIER
Filed Nov. 7, 1961   3 Sheets-Sheet 1

INVENTORS
SALLI ALFRED ROSENTHAL
BY
Hammond & Littell
ATTORNEYS

INVENTOR
SALLI ALFRED ROSENTHAL

United States Patent Office 3,147,863
Patented Sept. 8, 1964

3,147,863
EXTRUSION PRESS WITH ROTARY DIE CARRIER
Salli Alfred Rosenthal, Poole, Dorset, England, assignor to The Loewy Engineering Company Limited, Bournemouth, England, a corporation of Great Britain
Filed Nov. 7, 1961, Ser. No. 150,781
2 Claims. (Cl. 207—1)

This invention relates to a press in which metal billets are extruded into elongated solid or hollow articles of varying shapes. In such a press a billet is placed into the central bore of the container and then extruded through the aperture of a die placed at one end of the container bore under hydraulic pressure by means of a pressing stem. During the extrusion operation, die and container are held against displacement in the direction of the extrusion force by a heavy platen mounted on the bed-plate of the press and on which die and container are axially supported.

Between the die or its holder and the platen, one or more bolsters may be arranged through which the extrusion pressure is transmitted from the die to the platen.

As is well-known, it is not practicable to extrude the whole of a billet. A small residue forming a T-shaped stump at the end of the extruded article is always left as a discard in front of the die and in the container bore after an extrusion operation. This stump must be severed from the article before the latter can be moved within the press.

In many present-day extrusion presses the severing of the stump is effected between container and platen by a built-in retractable shear or saw. Before cutting off the stump, a portion of the extruded article near the stump has to be laid bare so that the cutting tool can enter therein. To this end and according to whether cutting is effected before or behind the die, the container and the die or parts of the die-assembly are axially moved apart after the extrusion of a billet and before the cutting tool becomes operative.

It is desirable to make provision in the same press for cutting the stump alternatively in front of or behind the die, so as to make the press more flexible and versatile in operation. Arrangements made for this purpose in known extrusion presses made it necessary to move the container in the axial direction after the extrusion of each billet and before the severing of the stump.

As containers are of considerable weight, their movement during an extrusion cycle should be reduced as much as possible or eliminated altogether; as little time as possible should be lost between the extrusion of a billet and the severing of the stump. However, the weight of the container makes it difficult to move it as rapidly as desired.

It is an object of the present invention to provide a metal extrusion press in which the stump can be cut off from the extruded article either in front of or behind the die without requiring any axial movement of the container between the extrusion of a billet and the cutting operation.

This object is achieved by providing in a metal extrusion press with a rotatable multi-die carrier means for displacing said carrier longitudinally along the centre line of the press and relative to the platen and the container, means to displace longitudinally and relative to said die carrier a die which is in the centre line of the press and a distance piece interposed between the platen and the carrier and withdrawable laterally with respect to the centre line of the press. The distance-piece is therefore made either in two separate parts which can be withdrawn in opposite directions or can be U-shaped.

The die and its holder are axially movable relative to and independently of other parts of the die-assembly, such as bolsters.

The cutting tool can be moved parallel to the press axis and while in its outside position, so that the tool can be selectively entered into the space in front of or behind the die.

After withdrawal of the distance-piece to the side, there is a clear space behind the die. If it is desired to cut the stump behind the die, the pressing tool is made to enter that space without further axial movement of the die. On the other hand, if it is desired to cut the stump in front of the die, the die is moved into the space formerly occupied by the distance-piece, and the cutting tool then enters the space formerly occupied by the die.

Figure 2:
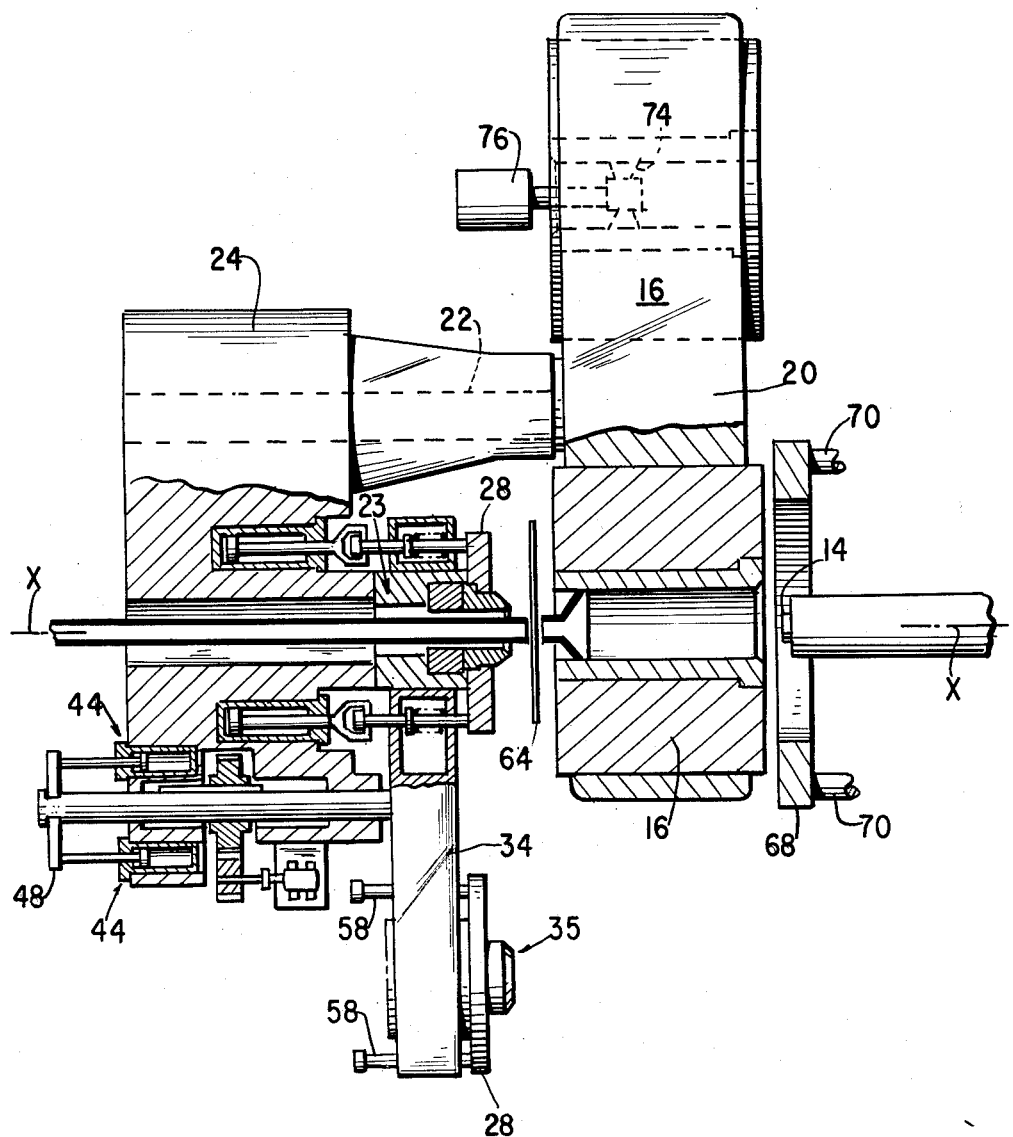
Figure 3:
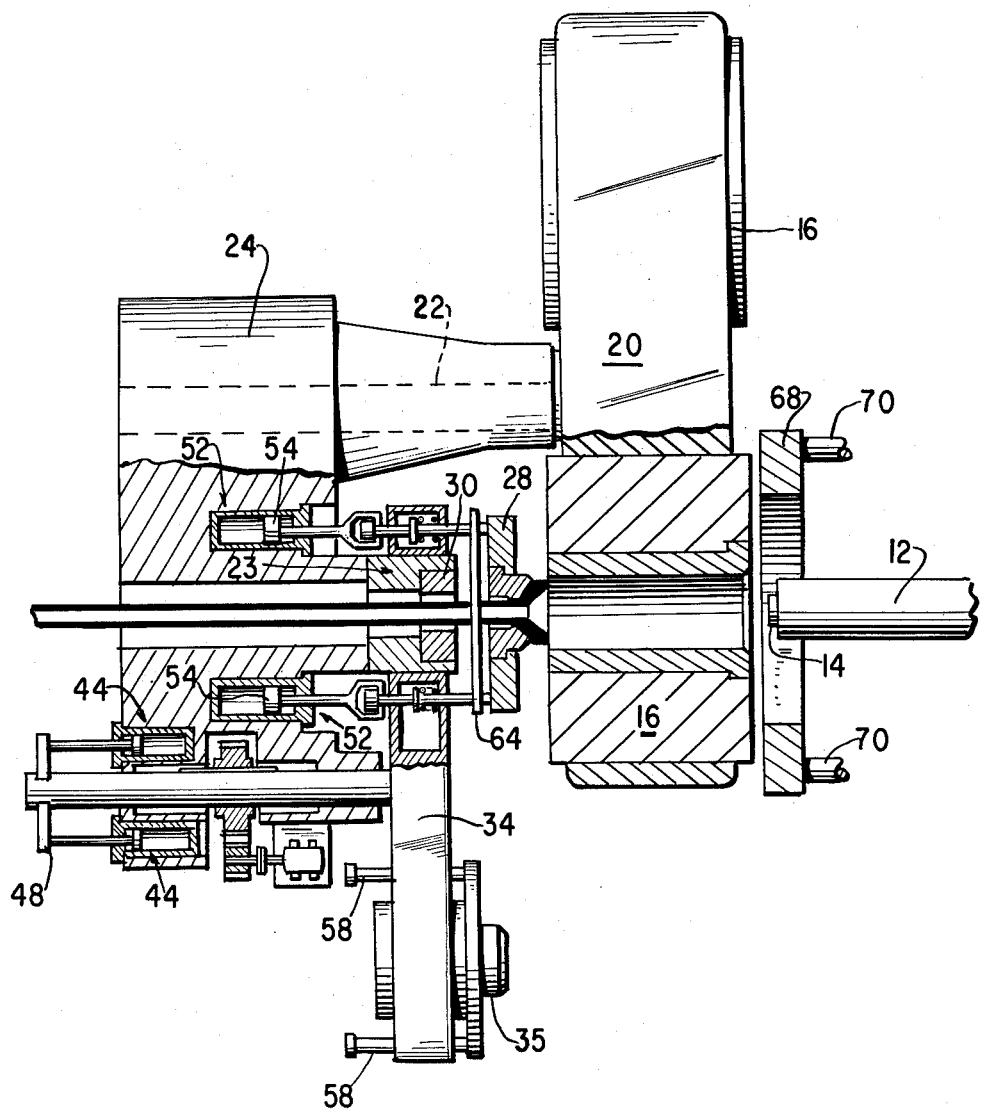

An embodiment of the invention will now be described with reference to the accompanying drawings, in which:

FIG. 1 is a section through a part of a metal extrusion press according to the invention showing the auxiliary tools of the press in readiness for an extrusion operation, FIG. 2 is a section corresponding to that of FIG. 1, showing the stump being severed by the cutting tool from the extruded article in front of the die, FIG. 3 is a section similar to that of FIG. 2 with the difference that the severing of the stump takes place behind the die.

The extrusion press shown in the drawings comprises a main ram 10 to which a hollow pressing stem 12 is attached. Both can be advanced along the main axis X—X of the press. A mandrel 14 can be telescoped in and out of the pressing stem and be moved likewise in the axis X—X. Arranged in this axis is a billet container 16 which can be entered by pressing stem and mandrel. The bore of the container 16 is adapted to receive prior to an extrusion operation a billet B together with a pressing disc 18.

The press shown in the drawings has two containers 16, both mounted on a carrier 20 which is rotatable about a shaft 22 extending parallel to the press axis. Rotation of the carrier successively moves the two containers 16 in the press axis X—X. The container which is outside the axis is then accessible for reconditioning and reloading.

Arranged in the axis X—X and behind the carrier 20 is a die assembly 23 which consists of the die 26 itself, a die holder 28, a pressure ring 30 and a bolster 32. The die assembly 23 is arranged on a carrier 34 which can be rotated about an axis parallel to the axis X—X in a manner presently to be described. A second die assembly 35 is arranged on the carrier 34 so that by rotating the carrier, the two die assemblies can be moved in succession into the axis X—X. The die assembly outside the axis is then accessible for reconditioning or for the exchange of a die.

A heavy platen 24 is mounted on the bed plate, not shown, of the press. This platen serves as an axial support of container and die and prevents their displacement in the direction of the extrusion force. During an extrusion operation the aforementioned parts take the positions shown in FIG. 1, with a hollow billet B being inserted in the bore of that container 16 which is in the axis X—X. Extrusion progresses in the well-known manner in which an extruded article is pressed out of the container through the die 26 and the aligned openings of the ring 30, the bolster 32 and a tunnel 62 in the platen 24.

Inserted between the die assembly 23 and the platen 24 is a distance piece 36 which can be withdrawn to the side by means not shown. The distance piece is U-shaped so that it can be moved to the side without colliding with an extruded article. As an alternative, the distance piece 36 may be made in two halves which upon withdrawal are opened.

The die carrier 34 is connected to a hollow shaft 38 supported in the platen 24. Rotation of this shaft is effected by means of an electric motor 40 through a reduction gear 42, splined to the shaft 38 so that the latter can be axially displaced without the gear. Axial displacement of shaft 38 is effected by two hydraulic cylinder- and ram-units 44 arranged at one side of the platen 24, the rams 46 of these units being connected to a crosspiece 48 which enters an annular groove 50 in shaft 38. In this way the shaft can be axially displaced by the rams 46 and relative to the reduction gear 42. The units 44 are double-acting so that they can displace the shaft 38 and thereby the carrier 34 in opposite directions.

The die holder 28 is in the form of a small crosshead, and can be displaced relative to the carrier 34 by means of hydraulic ram- and cylinder-units 52. The latter are built into the platen 24 at opposite sides of the press axis and comprise pistons 54 whose rods 56 are forked at their ends so as to clasp short coupling pins 58 which extend from the crosshead 28. The pins are urged into contact with the forked heads of the rods 56 by means of springs 60. Upon rotation of the carrier 34 the rods 56 and the pins 58 are disengaged from each other.

After an extrusion operation has been terminated, the unextruded end of the billet must be severed from the extruded article. This is done by means of a saw 64 which is only diagrammatically shown in the drawings. It may be of any well-known and suitable design and be so mounted that it is normally outside the press axis, but can be readily moved into the axis for cutting purposes. To this end the saw is mounted on an arm, supported on a carriage which can be displaced parallel to the press axis.

After the extrusion of a billet, the distance piece 36 is withdrawn to the side and the carrier 34 is shifted towards the platen 24 by means of the hydraulic units 44 into the space which was previously occupied by the distance piece (see FIG. 2). The bolster 32 is then in contact with an annular boss 66 on the platen 24. If it is desired to cut the stump from the extruded article in front of the die 26, i.e. on the container side of the die, no further movement of the press parts is required.

If on the other hand it is desired to cut the stump at the opposite side of the die 26, i.e., between die and pressure ring 30, the die holder 28 is first advanced from the position of FIG. 2 relative to the carrier 24 by means of ram- and cylinder-units 52, the die being thus moved away from the platen 24 and into the position shown in FIG. 3. The saw 64 (which has been displaced beforehand parallel to axis X—X) can then enter the extruded article between die 26 and pressure ring 30 as shown in FIG. 3. If desired, the movement of the carrier 34 relative to the platen 24 and the movement of the die 26 relative to the carrier 34 can take place simultaneously whereby time is saved.

It will be seen from the foregoing that in both cases there is no need to move the container at the termination of an extrusion operation for the purpose of severing the stump. However means may be provided for moving the container 16 relative to its carrier 20, should this be required for any other reasons. These means are shown as comprising a crosshead 68 arranged in the press axis and in front of the carrier 20, the crosshead being adapted to be displaced by rods 70 connected to hydraulic ram- and cylinder-units not shown. The crosshead 68 may be coupled to the container 16 which is in the press axis by means of pins not shown.

In FIG. 1 the container 16, which is outside the press axis, is shown as being freed from the pressing disc 18 and the stump by means of an ejector tool 72. In FIG. 2 the container is shown as being cleaned by a rotary brush 74 mounted on an axially displaceable head 76.

The invention is not limited to the embodiment illustrated in the accompanying drawings and is capable of various modifications. For instance, the shaft for the die carrier may be supported and rotated in a manner different from that shown in the drawings, and the die assembly may be built up differently. Whilst the press, illustrated in the drawings, is of the multi-container type, the invention may also be applied to presses with a single container.

I claim:

1. In a hydraulic metal extrusion press, a platen, a billet container, a die adapted to be moved into registry with said container, a carrier for said die, adapted to be rotated about an axis parallel to the axis of said container, means for displacing said carrier axially relative to said container, means for displacing said die axially relative to said carrier, a distance piece separate from said container and adapted to be inserted from the side between said platen and said carrier, said carrier being adapted after withdrawal of said distance piece to be moved into the space cleared by said distance piece and towards said platen and said die being adapted to be moved away from the space cleared by said distance piece and away from said platen, and means for cutting the unextruded portion of a billet from the extruded article.

2. In a hydraulic metal extrusion press, a platen, a billet container, a die adapted to be moved into registry with said container, a carrier for said die, a shaft extending parallel to the axis of said container and supporting said die carrier, means for rotating said shaft whilst permitting axial displacement thereof and means for axially displacing said shaft whilst permitting rotation thereof, means for displacing said die axially relative to said carrier, a distance piece separate from said container and adapted to be inserted from the side between said platen and said carrier, said carrier being adapted after withdrawal of said distance piece to be moved into the space cleared by said distance piece and towards said platen and said die being adapted to be moved away from the space cleared by said distance piece and away from said platen, and means for cutting the unextruded portion of a billet from the extruded article.

References Cited in the file of this patent

UNITED STATES PATENTS

| | | |
|---|---|---|
| 2,720,970 | Roux | Oct. 18, 1955 |
| 2,728,453 | Thweatt et al. | Dec. 27, 1955 |
| 2,896,782 | Billen | July 28, 1959 |
| 3,019,894 | Delcroix et al. | Feb. 6, 1962 |
| 3,028,006 | Petach et al. | Apr. 3, 1962 |

FOREIGN PATENTS

| | | |
|---|---|---|
| 1,163,770 | France | Apr. 28, 1958 |
| 1,233,403 | France | May 2, 1960 |